(12) United States Patent
Yeo (10) Patent No.: US 7,866,619 B2
(45) Date of Patent: Jan. 11, 2011

(54) MONITOR FOR VEHICLES

(75) Inventor: Bu Geun Yeo, Daegu (KR)

(73) Assignee: Hyundai Motor Company, Seoul (KR)

( * ) Notice: Subject to any disclaimer, the term of this patent is extended or adjusted under 35 U.S.C. 154(b) by 426 days.

(21) Appl. No.: 12/004,389

(22) Filed: Dec. 19, 2007

(65) Prior Publication Data

US 2009/0008526 A1    Jan. 8, 2009

(30) Foreign Application Priority Data

Jul. 6, 2007    (KR) .................... 10-2007-0068218

(51) Int. Cl.
*E04G 3/00* (2006.01)
(52) U.S. Cl. .................. 248/284.1; 248/274.1; 248/922
(58) Field of Classification Search ................ 248/133, 248/134, 135, 136, 139, 144, 148, 149, 150, 248/371, 922, 923, 274.1, 284.1, 286.1, 291.1; 348/825; 361/679.21, FOR. 104
See application file for complete search history.

(56) References Cited

U.S. PATENT DOCUMENTS

| | | | | |
|---|---|---|---|---|
| 6,554,242 B2 * | 4/2003 | Kim | .................... | 248/371 |
| 6,655,645 B1 * | 12/2003 | Lu et al. | .................... | 248/176.1 |
| 7,408,596 B2 * | 8/2008 | Kunz | .................... | 348/837 |
| 7,661,642 B2 * | 2/2010 | Oh et al. | .................... | 248/274.1 |
| 2002/0179791 A1 * | 12/2002 | Kwon | .................... | 248/284.1 |
| 2006/0219856 A1 * | 10/2006 | Oh | .................... | 248/274.1 |

* cited by examiner

*Primary Examiner*—A. Joseph Wujciak, III
(74) *Attorney, Agent, or Firm*—Edwards Angell Palmer & Dodge LLP; Peter F. Corless

(57) ABSTRACT

Disclosed herein is a tiltable monitor for vehicles. The monitor includes a base, a rotating shaft having external threads and connected to a reversible motor, and a moving bar having a screw hole through which the rotating shaft is inserted. The moving bar is reciprocated along the rotating shaft as the rotating shaft rotates. The monitor further includes a display panel and a support arm which connects the display panel to the base. A front end portion of the display panel is pivotably coupled to the base by the medium of the moving bar acting as hinge shaft, and reciprocated together with the moving bar. A first end of the support arm is pivotably connected to a side portion of the display panel and a second end of the support arm is pivotably connected to the base. The tilting structure of the monitor is simple.

8 Claims, 9 Drawing Sheets

MONITOR FOR VEHICLES

CROSS REFERENCE TO RELATED APPLICATIONS

This application claims priority to Korean Application No. 10-2007-0068218, filed on Jul. 6, 2007, the disclosure of which is incorporated herein by reference.

BACKGROUND

1. Technical Field

The present invention relates generally to monitors for vehicles and, more particularly, to a tiltable monitor for vehicles which can be automatically folded or unfolded for the convenience of a user.

2. Background Art

Monitors for navigators, TVs or PCs are being widely used in vehicles by the benefit of the development of digital technology. The monitors are usually a tiltable to improve the utilization of space.

In the conventional art, a monitor is automatically tilted using a motor. However, the structure for tilting the monitor is complex, so that the entire size of the monitor is increased. Furthermore, due to the large number of elements, the cost of manufacturing the monitor is increased, and there are problems of frequent malfunctions. As representative example, a tiltable monitor for a vehicle is disclosed in U.S. Patent No. 20050254202. The conventional monitor have complex structures in which many elements, including a pneumatic spring, a support arm, a sprocket, a guide and various gears, are assembled with each other.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and an object of the present invention is to provide a tiltable monitor for vehicles which has a simple structure compared to the conventional art.

Another object of the present invention is to provide a tiltable monitor for vehicles which can stably maintain a tilted state.

In order to accomplish the above objects, the present invention provides a monitor for vehicles, including: a base; a rotating shaft provided on the base in a horizontal direction and connected to a reversible motor, the rotating shaft having external threads on the outer surface thereof; a moving bar oriented in a direction perpendicular to the rotating shaft and having a screw hole through which the rotating shaft is inserted, wherein the moving bar is reciprocated along a longitudinal direction of the rotating shaft by forward/reverse rotation of the rotating shaft; a display panel pivotably coupled at a front end portion of the display panel to the base by the medium of the moving bar, wherein the moving bar act as a hinge shaft of the display panel; and a support arm pivotably connected at a first end thereof to the base and pivotably connected at a second end thereof to a side portion of the display panel.

The monitor for vehicles may further include a guide to guide the reciprocation motion of the moving bar.

Preferably, a length of the support arm may be extendable. Longitudinal extension or contraction of the support arm may be determined depending on an angle at which the first end of the support arm, which is rotatably coupled to the base using a first hinge pin, is pivoted with respect to the first hinge pin.

Also preferably, the length of the support arm may be extended when the display panel is completely closed, and a means for allowing the longitudinal extension of the support arm may be provided in the display panel and/or in the base.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft and the like.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings, which are given by way of illustration only, and thus are not limitative of the present invention, and wherein:

FIGS. 6A and 6B are views showing in detail a first end of the support arm of FIG. 5, wherein FIG. 6A illustrates a contracted state of the support arm and FIG. 6B illustrates an extended state of the support arm;

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

Hereinafter, a monitor for vehicles according to preferred embodiments of the present invention will be described in detail with reference to the attached drawings.

The construction of the monitor of the present invention will be described herein below with reference to FIG. 1.

The monitor includes a base 10, a display panel 20, which is provided in the base 10, a front end, which is rotatably coupled to the base 10, and a support arm 100, which couples the display panel 20 to the base 10. A moving bar 40 serves as the pivoting axis of the display panel 20. Depending on the forward or backward movement of the moving bar 40, the display panel 20 is closed or opened. The movement of the moving bar 40 is realized using a rotating shaft 30, which is operated by a motor 31.

The principle by which the moving bar 40 moves using the rotation of the rotating shaft 30 will be described with reference to FIG. 2.

The principle for this is easily appreciated in consideration of the engagement between a bolt and a nut. In detail, in the case where the nut is a stationary state, such that it cannot rotate, when the bolt, which is coupled to the nut, is rotated in a forward/reverse direction, the nut is moved forwards or backwards along the bolt in the longitudinal direction of the bolt. With regard to this, in the present invention, an external thread 33 is formed on the outer surface of the rotating shaft 30, which is operated by the motor 31, and an internal thread is formed in the moving bar 40, which is fitted over the rotating shaft 30. Therefore, when the rotating shaft 30 is rotated by the motor 31 in a forward/reverse direction, the moving bar 40 is moved forwards or backwards.

Figure 1:
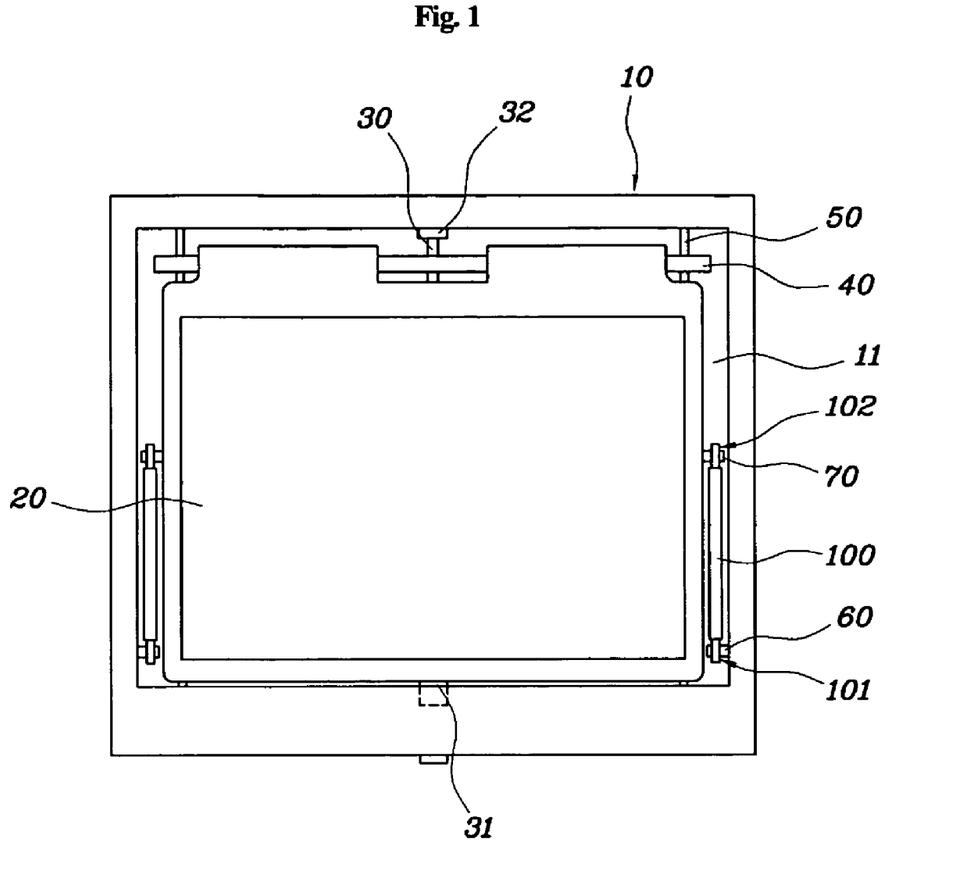
FIG. 1 is a plan view of a monitor according to an embodiment of the present invention.
Figure 2:
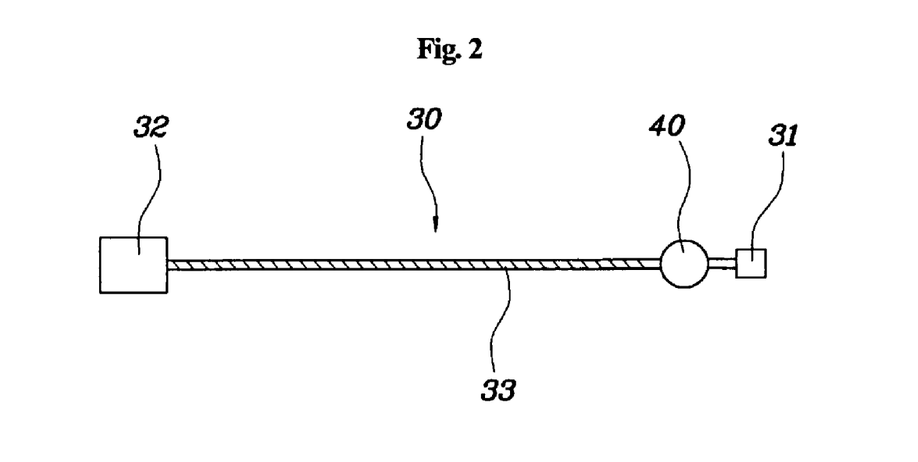
FIG. 2 is a schematic view illustrating the principle of the operation of tilting the monitor of FIG. 1.

Meanwhile, as shown in FIGS. 1 and 2, when the moving bar 40 is moved forwards or backwards, the front end of the display panel 20 is moved forwards or backwards along with the moving bar 40, which serves as the pivoting axis of the display panel 20. Here, support arms 100 are coupled to respective opposite side portions of the display panel 20, and the rear end of the display panel 20 is freely movable in an upward and downward direction. Therefore, the display panel 20 is naturally closed or opened by forward or backward movement of the moving bar 40. Each support arm 100 is rotatably coupled at respective opposite ends thereof to the base 10 and the display panel 20.

Figure 3:
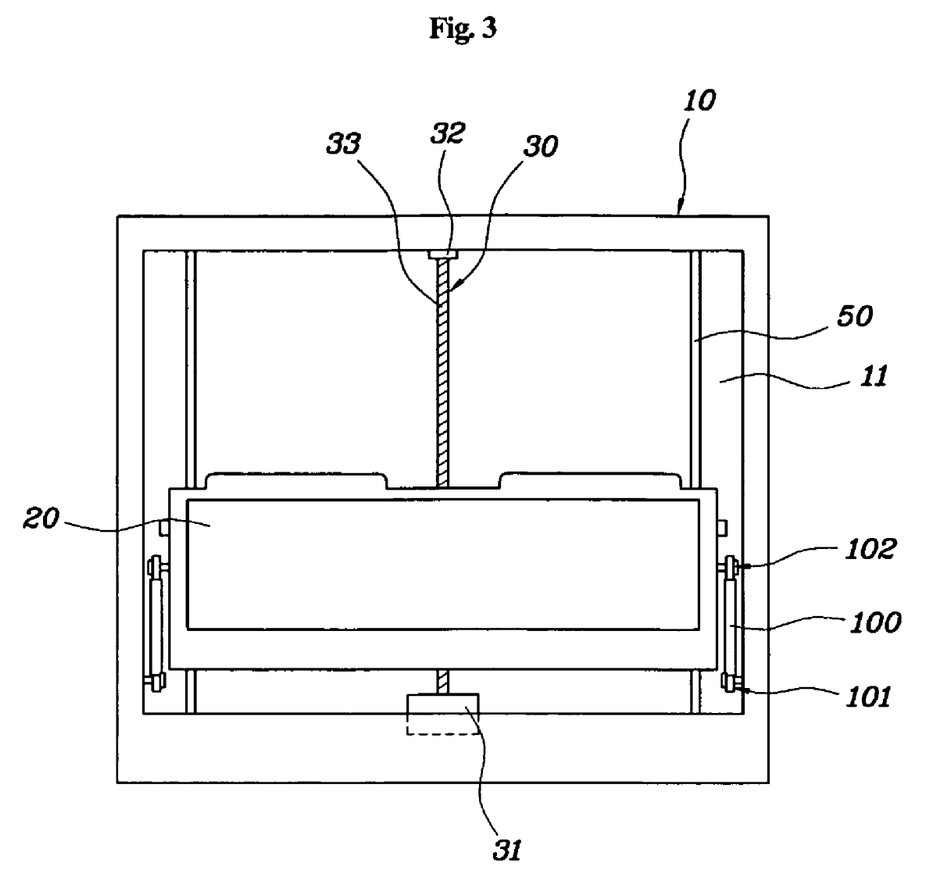
FIG. 3 is a view showing the state in which the monitor of FIG. 1 is partially tilted.

The construction of the monitor will be described in detail herein below with reference to FIGS. 1 and 3.

The base 10 has a rectangular frame shape. Furthermore, a panel seating depression 11 for receiving the display panel 20 is formed in the base 10. The rotating shaft 30, a guide 50 and a hinge pin 60, which will be explained herein, are provided in the panel seating depression 11 and are coupled to the stepped edge of the base 10.

The display panel 20 also has a rectangular frame and is disposed in the panel seating depression 11. The present invention is characterized in that the display panel 20 is pivotably coupled to the base 10 by the medium of the moving bar 40, which serves as the pivoting axis of the display panel 20.

The rotating shaft 30 is installed at a laterally central position in the panel seating depression 11. In detail, the rotating shaft 30 is oriented in the forward and backward direction. A bearing 32 is provided on the front end of the rotating shaft 30, and a reversible motor 31 is coupled to the rear end of the rotating shaft 30. The external thread 33 is formed on the outer surface of the rotating shaft 30. Of course, the rotating shaft 30 is disposed at a position spaced apart from the bottom of the panel seating depression 11 by a predetermined distance.

Figure 4:
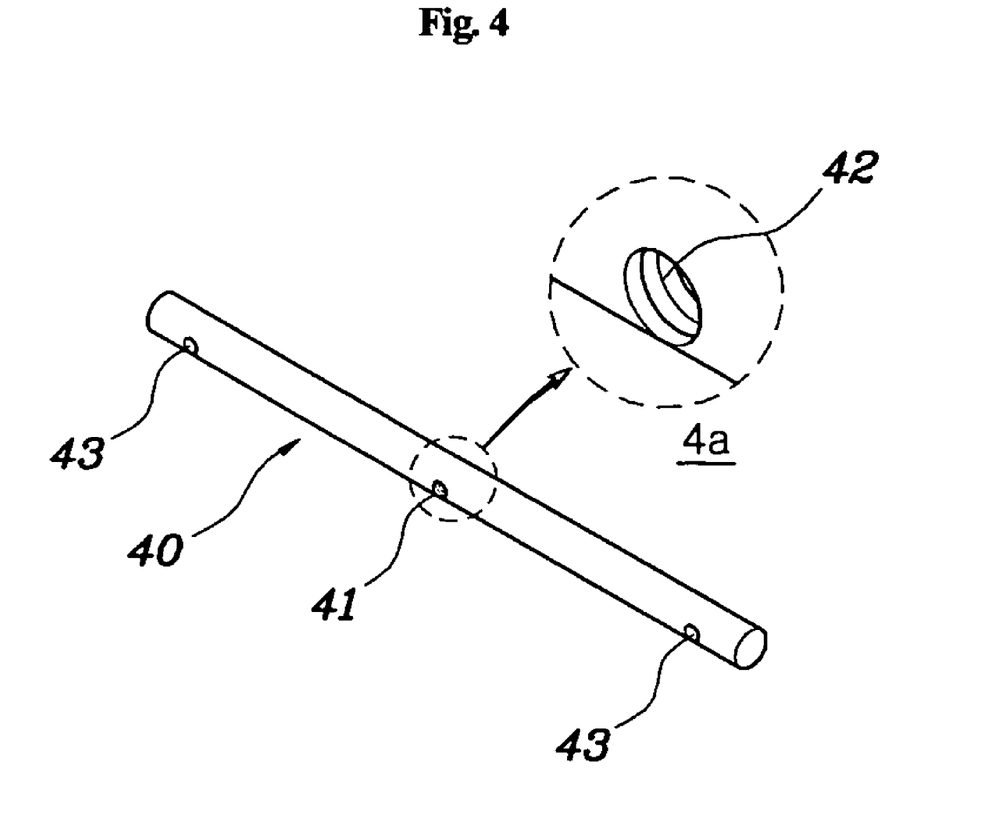
FIG. 4 is a view showing a moving bar separated from the monitor of FIG. 1.

The moving bar 40 is oriented in a direction perpendicular to the rotating shaft 30. Of course, the moving bar 40 is oriented parallel to the base 10. As shown in FIG. 4, a screw hole 41, through which the rotating shaft 30 is inserted, is formed at a medial position through the moving bar 40. The internal thread 42, which engages with the external thread 33 of the rotating shaft 30, is formed in the screw hole 41. In addition, guide holes 43, through which respective guides 50 are inserted, are formed through the respective opposite ends of the moving bar 40.

The guides 50 are provided in the base 10 on opposite sides of the rotating shaft 30 in directions parallel to the rotating shaft 30. The guides 50 serve to guide the moving bar 40, which moves along the rotating shaft 30, so that the moving bar 40 can be smoothly and stably moved under the guidance of the guides 50. Furthermore, the guides 50 serve to prevent the moving bar 40 from being rotated when the rotating shaft 30 is rotated.

The support arms 100 serve to couple the display panel 20 to the base 10 such that the display panel 20 can be stably opened or closed by the movement of the moving bar 40. In detail, a first end 101 of each support arm 100 is coupled to the base 10 using the first hinge pin 60, and a second end 102 of the support arm 100 is coupled to the corresponding side portion of the display panel 20 using a second hinge pin 70. The support arm 100 has a structure such that it can extend or contract to have a length appropriate for the angle at which the display panel 20 is opened.

Figure 5:
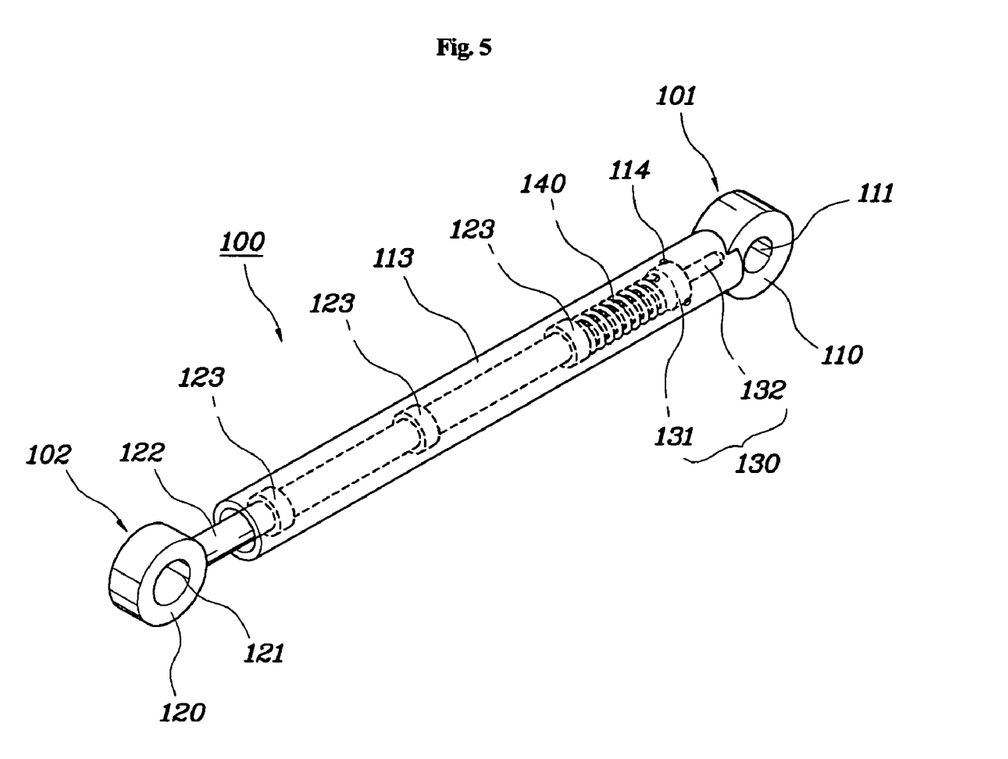
FIG. 5 is a view showing a support arm separated from the monitor of FIG. 1.

The construction of each support arm 100 will be described in detail with reference to FIGS. 5 through 6B.

The support arm 100 includes joints 110 and 120, which are provided on the respective opposite ends of the support arm 100, and a housing 113 and a rod 122, which respectively extend from the joints 110 and 120. The support arm 100 further includes a sealing member 130.

Each joint 110, 120 has therein a pin hole 111, 121, which is formed in a direction perpendicular to the longitudinal direction of the support arm 100. The first and second hinge pins 60 and 70 are respectively inserted through the pin holes 111 and 121.

The housing 113, which extends from the joint 110 of the first end 101 of the support arm 100, is a hollow member, which has air holes 114 at positions adjacent to the joint 110. Furthermore, the end of the housing 113 adjacent to the joint 110 is closed, and the end thereof opposite the joint 110 is open.

The rod 122, which extends from the joint 120 of the second end 102 of the support arm 100, is inserted into the housing 113. As well, sealing rings 123 are provided on the rod 122 at the front end thereof and at several positions spaced apart from each other in the longitudinal direction at predetermined intervals.

The sealing member 130, which is supported by a spring 140, is provided in a space between the front end of the rod 122 and the first end 101 of the support arm 100. The sealing member 130 includes a closing part 131, which closes the air holes 114 formed in the housing 113, and an extension part 132 extending towards the first end 101 of the support arm 100. The front end of the extension part 132 is round shaped. The sealing member 130 is elastically supported towards the joint 110 by the spring 140, which is provided between the front end of the rod 122 and the sealing member 130.

The closing part 131 closes the air holes 114 and, additionally, seals the housing 113 in the same manner as the sealing ring 123 of the rod 122. The extension part 132 is inserted into the joint 110 provided on the first end 101 of the support arm 100.

Figure 6A:
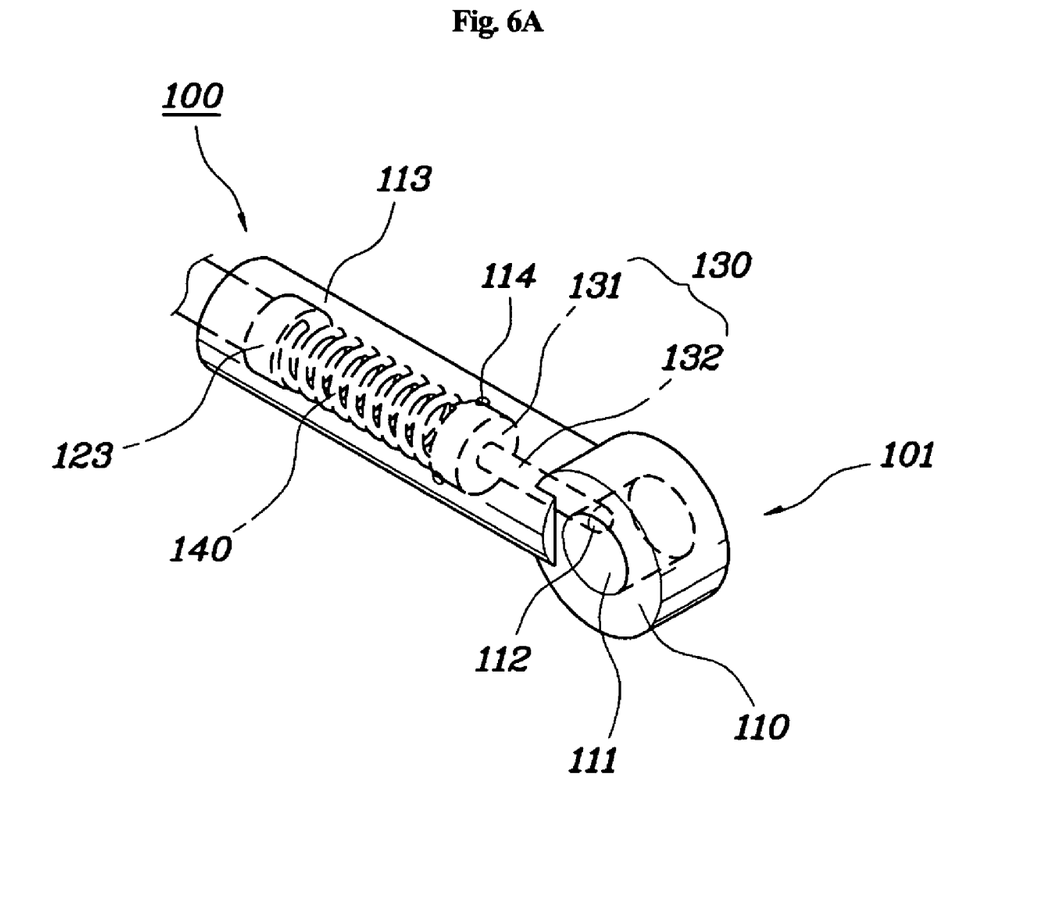

FIG. 6A is a view illustrating the state in which the sealing member 130 closes the air holes 114. As shown in FIG. 6A, the extension part 132, which is inserted through a through hole 112 of the joint 110, is prevented from entering the pin hole 111 by interference of the first hinge pin 60.

Figure 6B:
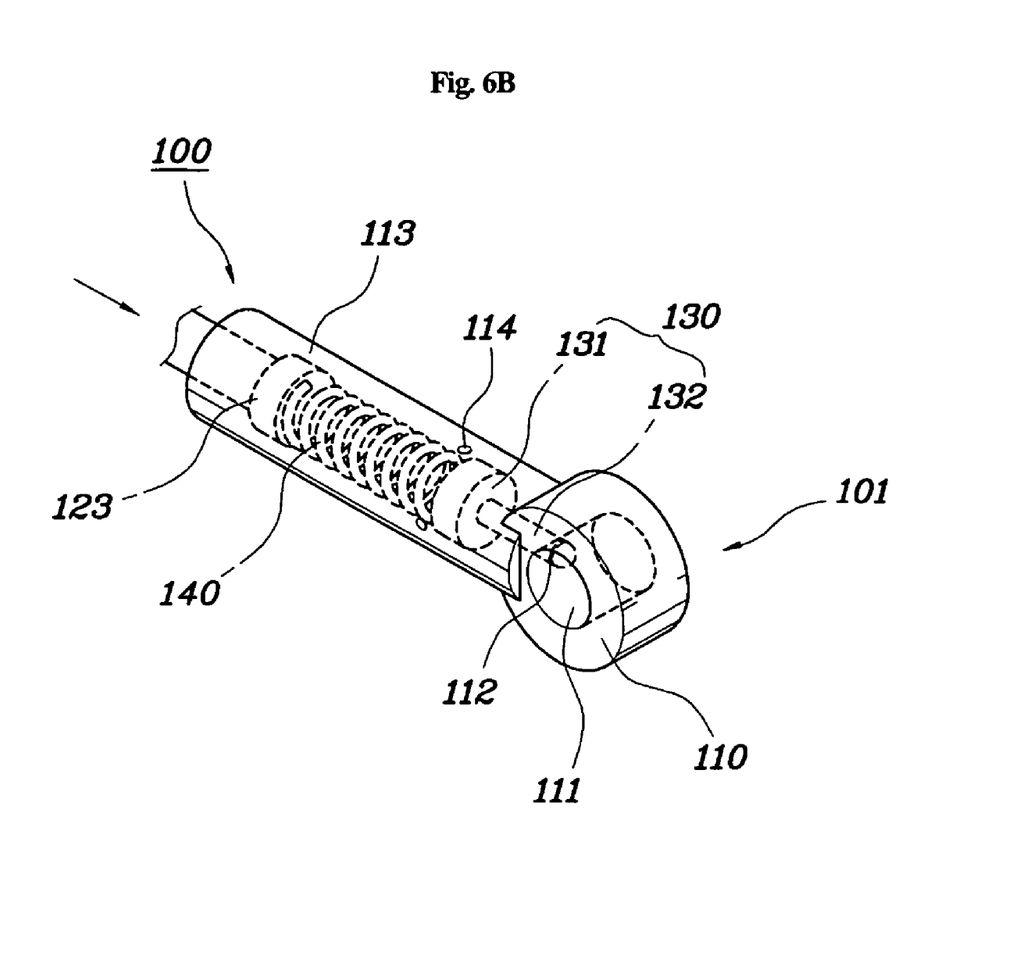

FIG. 6B is a view illustrating the opened state of the air holes 114. As shown in FIG. 6B, the sealing member 130 is moved towards the joint 110, which opens the air holes 114. To realize this state, the interference of the first hinge pin 60 with the extension part 132 must be eliminated. The means for eliminating the interference of the first hinge pin 60 will be clearly understood from the following description of FIG. 7.

Figure 7:
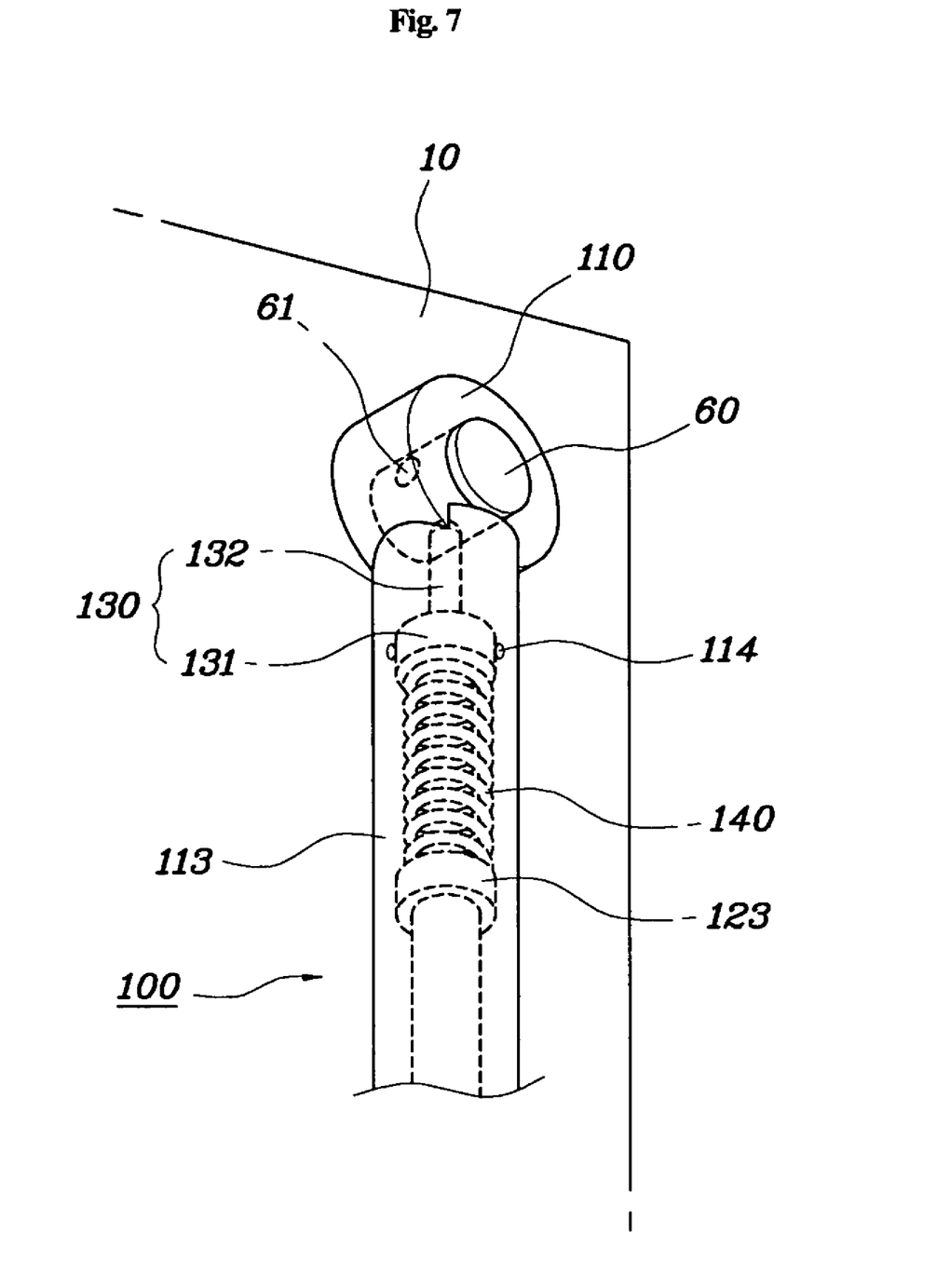
FIG. 7 is another view showing the extended state of the support arm FIG. 6B.

As shown in FIG. 7, a dent 61 is formed on the first hinge pin 60 which passes through the joint 110 of the first end 101 of the support arm 100. The first hinge pin 60 serves as a pivoting axis of the first end 101 of the support arm 100. When the display panel 20 is in its closed state, the end of the extension part 132 is received in the dent 61.

Meanwhile, when the end of the extension part 132 is inserted into the dent 61, the sealing member 130 is moved towards the joint 110. Thus, the closing part 131, which has closed the air holes 114, is removed from the air holes 114. Therefore, the support arm 100 enters a state in which air can be freely drawn into the housing. As a result, the rod 122, which has been supplied with elastic force from the spring 140, enters a state in which it is movable towards the second end 102 of the support arm 100. In other words, the support arm 100 enters an extendable state.

The means for enabling the support arm 100 to extend and making it possible for the support arm 100 in the extended state to reliably maintain the closed state of the display panel 20 will be described herein below with reference to FIG. 8 and to the previous drawings.

Figure 8A:
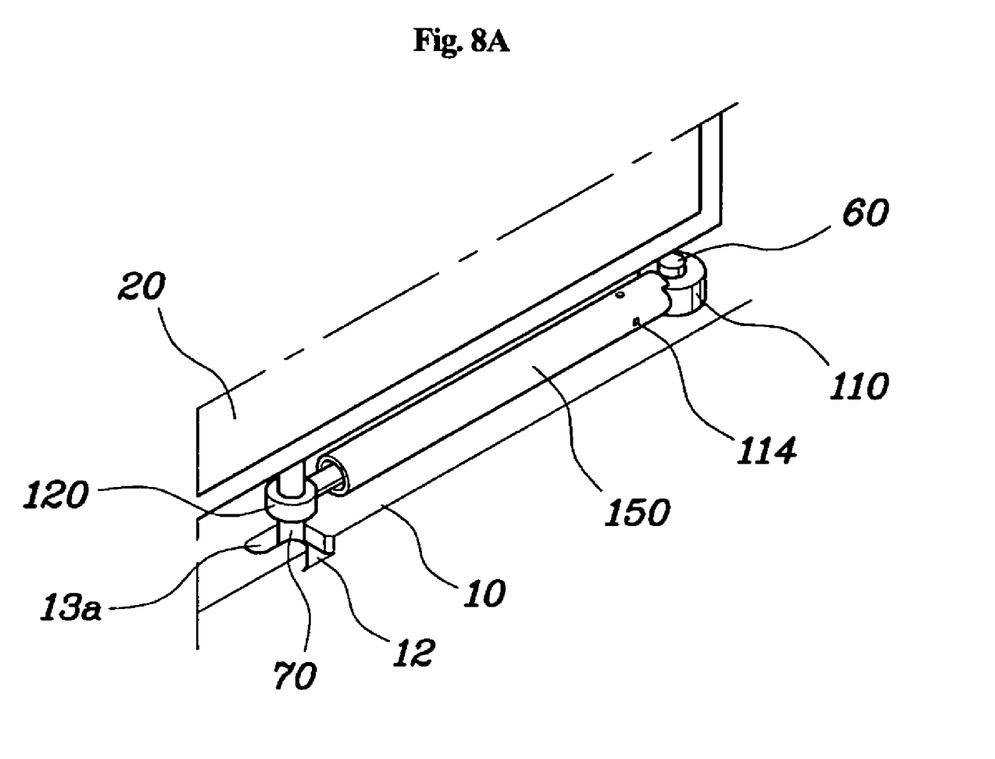
FIGS. 8A and 8B are views illustrating the second end of the extended support arm, which is seated into a base of the monitor according to the present invention.

FIG. 8A is a view showing the state of the monitor at the moment that the display panel 20 is closed. The end of the second hinge pin 70 that passes through the joint 120 of the second end 102 of the support arm 100 protrudes outside the joint 120. To prevent the protruding end of the second hinge pin 70 from interfering with the base 10, a seating groove 12 is formed in the base 10. Furthermore, an extension groove 13a, which extends from the seating groove 12 to define space for extension of the support arm 100, is formed in the base 10.

Figure 8B:
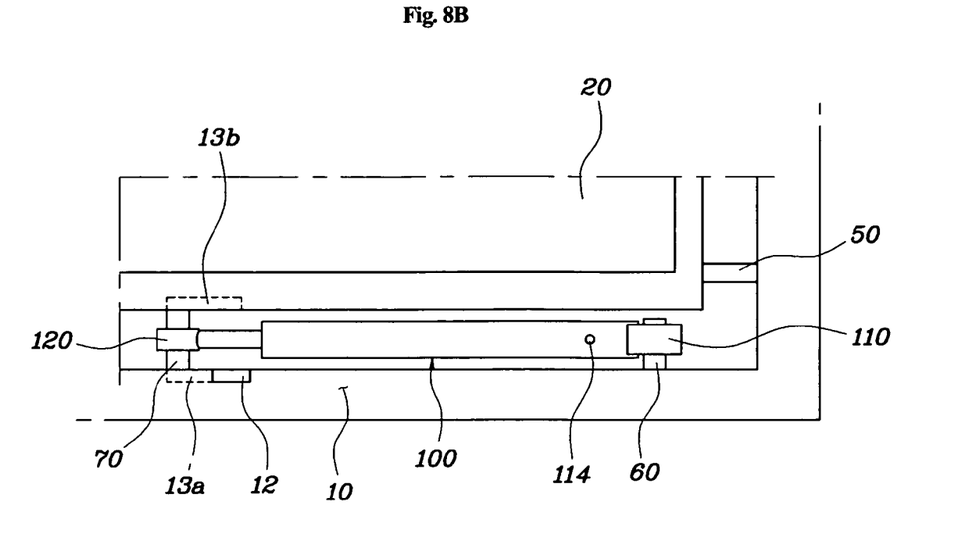

FIG. 8B is a view showing the state of the monitor just after the display panel 20 is closed, that is, just after the state of FIG. 8A. When the support arm 100 is extended, the protruding end of the second hinge pin 70 is moved along the extension groove 13a of the base 10. Furthermore, an extension groove 13b for ensuring the extension of the support arm 100 is also formed in the corresponding side portion of the display panel 20, to which the hinge pin 70 is rotatably coupled. Here, the extension part 13b is a means for enabling the extension of the support arm 100 and for restricting the second end 102 of the extended support arm 100.

Meanwhile, when the display panel 20 is opened again, the moving bar 40 is moved backwards. At this time, force for moving the display panel 20 backwards is applied to the display panel 20. This force is transmitted to the support arm 100, thus reducing the length of the spring 140 and the length of the support arm 100. Thereby, the second end 102 of the support arm 100 enters the state of being removable from the seating groove 12. During this process, the first end 101 of the support arm 100 is pivoted around the first hinge shaft 60, so that the air holes 114 are again sealed. Thereby, the support arm 100 can maintain the contracted state.

As described above, in a monitor for vehicles according to the present invention, there is an advantage in that the tilting structure is simple.

Furthermore, in the tilted state of the monitor, support arms are extended in length and are held by a base, thus reliably maintaining the tilted state thereof.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A monitor for vehicles, comprising:
   a base;
   a rotating shaft provided on the base and connected to a reversible motor,
   the rotating shaft having external threads on the outer surface thereof;
   a moving bar oriented in a direction perpendicular to the rotating shaft and having a screw hole
   through which the rotating shaft is inserted, wherein the moving bar is reciprocated along a
   longitudinal direction of the rotating shaft by forward/reverse rotation of the rotating shaft;
   a display panel pivotably coupled at a front end portion of the base by the moving bar; and
   a support arm pivotably connected at a first end thereof to the base and pivotably connected at a
   second end thereof to a side portion of the display panel, a length of the support arm being extendable,
   wherein the support arm comprises:
   a hollow housing extending from the first end of the support arm, with an air hole formed in the housing at a position adjacent to the first end of the support arm;
   a rod extending from the second end of the support arm, the rod being inserted into the housing and sealing the housing;
   a sealing member comprising a closing part provided in the housing and elastically supported by an end of the rod, the closing part sealing the air hole, and an extension part extending from the closing part, the extension part passing through the first end of the support arm in a direction perpendicular to a direction in which a first hinge pin passes through the first end of the support arm, so that an end of the extension part is interfered with or is stopped by the first hinge pin.

2. The monitor for vehicles as set forth in claim 1, further comprising:
   a guide to guide the reciprocation motion of the moving bar.

3. The monitor for vehicles as set forth in claim 2, wherein the guide comprises a bar provided in the base in a direction parallel to the rotating shaft, the bar passing through the moving bar.

4. The monitor for vehicles as set forth in claim 1, wherein longitudinal extension or contraction of the support arm is determined depending on an angle at which the first end of the support arm, which is coupled to the base using the first hinge pin, is pivoted with respect to the first hinge pin.

5. The monitor for vehicles as set forth in claim 4, wherein, when the display panel is closed, the length of the support arm is extended [in the base and/or in] the side portion of the display panel, which is coupled to the second end of the support arm.

6. The monitor for vehicles as set forth in claim 5, wherein when the display panel is closed, the second end of the support arm is restricted in its extended state from moving in a direction perpendicular to the longitudinal direction of the support arm.

7. The monitor for vehicles as set forth in claim 1, wherein the first hinge pin has a dent thereon to receive the end of the extension part when the display panel is in its closed state.

8. The monitor for vehicles as set forth in claim 7, wherein, when the display panel is closed, the end of the extension part is inserted into the dent of the first hinge pin, and a seating groove is formed in the base so that a hinge pin, passing through the second end of the support arm, is seated into the seating groove when the display panel is closed, and extension grooves to allow the longitudinal extension of the second end of the support arm are respectively formed in the seating groove and in the side portion of the display panel, to which the second end of the support arm is coupled, in a direction in which the second end of the support arm extends.

* * * * *